(12) United States Patent
Hua et al.

(10) Patent No.: US 11,996,993 B2
(45) Date of Patent: May 28, 2024

(54) PACKET TRANSMISSION METHOD, APPARATUS, AND SYSTEM, AND STORAGE MEDIUM

(71) Applicant: Huawei Technologies Co., Ltd., Shenzhen (CN)

(72) Inventors: Rongrong Hua, Nanjing (CN); Zhouyi Yu, Beijing (CN); Tao Peng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/155,367

(22) Filed: Jan. 17, 2023

(65) Prior Publication Data

US 2023/0155899 A1 May 18, 2023

Related U.S. Application Data

(63) Continuation of application No. PCT/CN2021/104820, filed on Jul. 6, 2021.

(30) Foreign Application Priority Data

Jul. 16, 2020 (CN) .......................... 202010688086.7

(51) Int. Cl.
*H04L 41/5022* (2022.01)
*H04L 12/46* (2006.01)

(52) U.S. Cl.
CPC ...... *H04L 41/5022* (2013.01); *H04L 12/4641* (2013.01)

(58) Field of Classification Search
CPC .................. H04L 41/5022; H04L 12/4641
See application file for complete search history.

(56) References Cited

U.S. PATENT DOCUMENTS

| 10,582,393 | B2 * | 3/2020 | Deviprasad | H04L 47/70 |
| 11,202,231 | B2 * | 12/2021 | Park | H04W 24/10 |
| 11,432,202 | B2 * | 8/2022 | Qiao | H04W 28/24 |
| 2018/0234915 | A1 | 8/2018 | Zait | |

(Continued)

FOREIGN PATENT DOCUMENTS

| CN | 107517488 A | 12/2017 |
| CN | 108513290 A | 9/2018 |

(Continued)

OTHER PUBLICATIONS

Kurtz et al., "Network Slicing for Critical Communications in Shared 5G infrastructures—An Empirical Evaluation" 2018 4th IEEE Conference on Network Softwarization and Workshops (NetSoft), Jun. 25, 2018.*

(Continued)

*Primary Examiner* — Todd L Barker
(74) *Attorney, Agent, or Firm* — Conley Rose, P.C.

(57) ABSTRACT

A method includes: receiving a service request, where the service request includes service information of a terminal device that is to perform access; and determining a first device and a first sliced network based on the service information of the terminal device, where the first sliced network is between the first device and a second device, the service request is forwarded by the second device, and the first sliced network transmits a data packet of the terminal device.

18 Claims, 3 Drawing Sheets

(56) References Cited

U.S. PATENT DOCUMENTS

| | | | |
|---|---|---|---|
| 2018/0287894 A1* | 10/2018 | Senarath | ............... H04L 41/40 |
| 2019/0124704 A1* | 4/2019 | Sun | ..................... H04W 28/24 |
| 2019/0281541 A1* | 9/2019 | Zhang | ................. H04W 36/00 |
| 2020/0053828 A1 | 2/2020 | Bharatia et al. | |
| 2020/0366567 A1 | 11/2020 | Li | |
| 2021/0136653 A1 | 5/2021 | Zhang | |

FOREIGN PATENT DOCUMENTS

| | | |
|---|---|---|
| CN | 110120879 A | 8/2019 |
| CN | 110621045 A | 12/2019 |
| CN | 111726839 A | 9/2020 |
| EP | 3528519 A1 | 8/2019 |

OTHER PUBLICATIONS

Khodapanah et al., "Radio Resource Manaement in context of Network Slicing: What isMissing in Exisiting Mechanims?", 2019 IEEE Wireless Communications and Networking Conference, Apr. 15, 2019.*

She et al., "Optimizing Resource Allocation for 5G Services with Diverse Quality-of-Service Requirements", 2019 IEEE Global Communications Conference (GLOBECOM), Dec. 9, 2019.*

Kotulski et al., "On end-to-end approach for slice isolation in 5G networks, Fundamental Challenges", 2017 Federated Conference on Computer Science and Information Systems, Sep. 3, 2017.*

Bulakci et al., "Traffic Steering and Resource Management", Apr. 10, 2018, Wiley Publishing.*

Mumtaz et al., "D3.2: SPEED-5G enhanced functional and system architecture, scenarios and performance evaluation metrics" Nov. 20, 2016.*

Habibi et al, "The Structurte of Service Level Agreement of Slice-based 5G Network", Jun. 27, 201.*

TR-459, Control and User Plane Separation for a disaggregated BNG, Jun. 2020, 102 pages, XP055938467.

* cited by examiner

PACKET TRANSMISSION METHOD, APPARATUS, AND SYSTEM, AND STORAGE MEDIUM

CROSS-REFERENCE TO RELATED APPLICATIONS

This application is a continuation application of International Patent Application No. PCT/CN2021/104820 filed on Jul. 6, 2021, which claims priority to Chinese Patent Application No. 202010688086.7 filed on Jul. 16, 2020. The disclosures of the aforementioned applications are hereby incorporated by reference in their entireties.

TECHNICAL FIELD

This application relates to the communication field, and in particular, to a packet transmission method, apparatus, and system, and a storage medium.

BACKGROUND

As a conventional broadband access gateway device, a broadband network gateway (BNG) plays an important role in a user broadband access service and scenario. For user access, the BNG device provides the following main functions: user authentication, access control, traffic scheduling, and the like. In a communication network, after decoupling of a forwarding plane and a control plane in the BNG, the control plane (CP) can manage a plurality of user planes (UPs), and schedule users, traffic, and resources of the plurality of user planes. Compared with a single-node device, utilization and reliability of the device are greatly improved.

The communication network may further include functional units such as a steering function (SF) and a user plane steering function (USF). The SF may be connected to one or more UPs. A terminal device may access the network through the SF and one UP.

When the terminal device requests to access the network, the terminal device sends an access request to the CP. The access request is first sent to the CP through the SF. After receiving the access request, the CP communicates with the USF, and then the USF selects one UP for the terminal device to go online. After the USF selects the UP for the terminal device, a packet of the terminal device is transmitted through the SF and the corresponding UP.

In a conventional technology, a plurality of terminal devices may access a network through any UP, and share a network between an SF and the UP. In this way, for a terminal device that has a high network performance requirement, the network performance requirement of the terminal device cannot be ensured.

SUMMARY

This application provides a packet transmission method, apparatus, and system, and a storage medium, to meet a network performance requirement of a terminal device. The technical solutions are as follows.

According to a first aspect, this application provides a packet transmission method. The method includes receiving a service request, where the service request includes service information of a terminal device that is to perform access, and determining a first device and a first sliced network based on the service information of the terminal device, where the first sliced network is a sliced network between the first device and a second device, the service request is forwarded by the second device, and the first sliced network is used to transmit a data packet sent by the terminal device. Because the first sliced network is an end-to-end tunnel between the second device and the first device, after the first sliced network that meets a network performance requirement of the terminal device is determined based on the service information of the terminal device, the second device and the first device may transmit the data packet of the terminal device through the first sliced network. In addition, the terminal device exclusively occupies the first sliced network. Therefore, the network performance requirement of the terminal device is met.

In a possible implementation, the service information includes a user identifier of the terminal device.

In another possible implementation, the method further includes obtaining a first service-level agreement (SLA) level based on a user identifier.

In another possible implementation, the service information includes a first SLA level of the terminal device.

In another possible implementation, the method further includes obtaining a device identifier of the first device and a network identifier of the first sliced network based on the first SLA level, and determining the first device based on the device identifier of the first device, and determining the first sliced network based on the network identifier of the first sliced network. Because the first device and the first sliced network are obtained based on the first SLA level, the first device and the first sliced network can meet the network performance requirement of the terminal device.

In another possible implementation, the method further includes receiving a control message, where the control message includes a second SLA level of the terminal device, and determining, based on the second SLA level, a third device and a second sliced network that meet the second SLA level, where the second sliced network is a sliced network between the third device and the second device, and the second sliced network is used to transmit the data packet of the terminal device. In this way, when an SLA level of the terminal device changes from the first SLA level to the second SLA level, the third device and a third sliced network that meet the second SLA level are determined, so that the data packet of the terminal device is transmitted through the third sliced network. This meets a new network performance requirement of the terminal device.

In another possible implementation, the method further includes sending first interface information to the first device based on the device identifier of the first device and the network identifier of the first sliced network, where a first interface corresponding to the first interface information includes an interface corresponding to the first sliced network on the first device. In this way, the first device configures the first interface to transmit the data packet of the terminal device, so that the data packet of the terminal device is transmitted through the first sliced network.

In another possible implementation, the method further includes sending a first configuration instruction, where the first configuration instruction instructs the second device to configure a second interface, and the second interface includes an interface corresponding to the first sliced network on the second device. In this way, the first interface is configured to transmit the data packet of the terminal device, so that the data packet of the terminal device is transmitted through the first sliced network.

In another possible implementation, the first configuration instruction includes an identifier of the terminal device and second interface information, and the first configuration instruction instructs the second device to bind a virtual local area network (VLAN) corresponding to the identifier of the terminal device and the second interface corresponding to the second interface information.

In another possible implementation, the first configuration instruction includes user information corresponding to the terminal device, a device identifier of the second device, and the network identifier of the first sliced network, and the first configuration instruction instructs a controller to send the control message to the second device based on the user information, the device identifier of the second device, and the network identifier of the first sliced network, to instruct the second device to bind a VLAN corresponding to a device identifier of the terminal device and the second interface corresponding to second interface information.

In another possible implementation, the method further includes sending a second configuration instruction, where the second configuration instruction instructs the first device to bind the first sliced network and a third sliced network, transmission performance of the third sliced network corresponds to transmission performance of the first sliced network, and the third sliced network is used to transmit the data packet that corresponds to the service information and that is sent by the terminal device through the first sliced network. The third sliced network is a sliced network between the first device and an uplink network. Because the transmission performance of the third sliced network corresponds to the transmission performance of the first sliced network, when the packet of the terminal device is transmitted through the third sliced network, the network performance requirement of the terminal device can also be met between the first device and the uplink network.

In another possible implementation, the method is applied to a bandwidth access network system in which a CP and a UP are separated.

In another possible implementation, the first device includes a BNG UP device, and the second device includes an SF device.

According to a second aspect, this application provides a packet transmission method. The method includes receiving an access request, where the access request includes a user identifier of a terminal device that is to perform access, obtaining a first SLA level of the terminal device based on the user identifier, and sending a network allocation request to a USF, where the network allocation request includes the first SLA level, the network allocation request is used by the USF to determine a first device and a first sliced network based on the first SLA level, the first sliced network is a sliced network between the first device and a second device, the access request is forwarded by the second device, and the first sliced network is used to transmit a data packet of the terminal device. Because the first sliced network is an end-to-end tunnel between the second device and the first device, and is determined based on the first SLA level, the second device and the first device may transmit the data packet sent by the terminal device through the first sliced network. The terminal device exclusively occupies the first sliced network. Therefore, a network performance requirement of the terminal device is met.

In a possible implementation, the method further includes receiving a device identifier of the first device and a network identifier of the first sliced network that are sent by the USF, and sending first interface information to the first device based on the device identifier of the first device and the network identifier of the first sliced network, where a first interface corresponding to the first interface information includes an interface corresponding to the first sliced network on the first device. In this way, the first device configures the first interface to transmit the data packet of the terminal device, so that the data packet of the terminal device is transmitted through the first sliced network.

According to a third aspect, this application provides a packet transmission apparatus configured to perform the method according to any one of the first aspect or the possible implementations of the first aspect. Further, the apparatus includes units configured to perform the method according to any one of the first aspect or the possible implementations of the first aspect.

According to a fourth aspect, this application provides a packet transmission apparatus configured to perform the method according to any one of the second aspect or the possible implementations of the second aspect. Further, the apparatus includes units configured to perform the method according to any one of the second aspect or the possible implementations of the second aspect.

According to a fifth aspect, this application provides a packet transmission apparatus. The apparatus includes a processor, a memory, and a transceiver. The processor, the memory, and the transceiver may be connected through a bus system. The memory is configured to store one or more programs. The processor is configured to execute the one or more programs in the memory, to enable the apparatus to complete the method according to any one of the first aspect or the possible implementations of the first aspect.

According to a sixth aspect, this application provides a packet transmission apparatus. The apparatus includes a processor, a memory, and a transceiver. The processor, the memory, and the transceiver may be connected through a bus system. The memory is configured to store one or more programs. The processor is configured to execute the one or more programs in the memory, to enable the apparatus to complete the method according to any one of the second aspect or the possible implementations of the second aspect.

According to a seventh aspect, this application provides a computer-readable storage medium. The computer-readable storage medium stores program code. When the program code is run on a computer, the computer is enabled to perform the method according to any one of the first aspect, the second aspect, the possible implementations of the first aspect, or the possible implementations of the second aspect.

According to an eighth aspect, this application provides a computer program product including program code. When the computer program product runs on a computer, the computer is enabled to perform the method according to any one of the first aspect, the second aspect, the possible implementations of the first aspect, or the possible implementations of the second aspect.

According to a ninth aspect, this application provides a packet transmission system. The system includes a gateway management device, a first device, and a second device. The gateway management device is configured to receive a service request forwarded by the second device, where the service request includes service information of a terminal device that is to perform access. The gateway management device is further configured to determine the first device and a first sliced network based on the service information of the terminal device, where the first sliced network is a sliced network between the first device and the second device, and the first sliced network is used to transmit a data packet of the terminal device. Because the first sliced network is an end-to-end tunnel between the second device and the first device, after the first sliced network that meets a network performance requirement of the terminal device is determined based on the service information of the terminal device, the second device and the first device may transmit the data packet of the terminal device through the first sliced network. In addition, the terminal device exclusively occupies the first sliced network. Therefore, the network performance requirement of the terminal device is met.

In some embodiments, in the system according to the ninth aspect, the gateway management device is the apparatus according to the third aspect or the fifth aspect.

According to a tenth aspect, this application provides a packet transmission system. The system includes a USF, a CP, a first device, and a second device. The CP is configured to receive an access request forwarded by the second device, where the access request includes a user identifier of a terminal device that is to perform access, obtain a first SLA level of the terminal device based on the user identifier, and send a network allocation request to the USF, where the network allocation request includes the first SLA level. The USF is configured to determine the first device and a first sliced network based on the first SLA level, where the first sliced network is a sliced network between the first device and the second device, the access request is forwarded by the second device, and the first sliced network is used to transmit a data packet of the terminal device. Because the first sliced network is an end-to-end tunnel between the second device and the first device, after the USF determines, based on the first SLA level of the terminal device, the first sliced network that meets a network performance requirement of the terminal device, the second device and the first device may transmit the data packet of the terminal device through the first sliced network. In addition, the terminal device exclusively occupies the first sliced network. Therefore, the network performance requirement of the terminal device is met.

In some embodiments, in the system according to the tenth aspect, the gateway management device is the apparatus according to the fourth aspect or the sixth aspect.

BRIEF DESCRIPTION OF DRAWINGS

FIG. 4 is a flowchart of a packet transmission method according to an embodiment of this application;

FIG. 5A and FIG. 5B are a flowchart of another packet transmission method according to an embodiment of this application;

FIG. 6A and FIG. 6B are a flowchart of another packet transmission method according to an embodiment of this application;

FIG. 7 is a flowchart of another packet transmission method according to an embodiment of this application;

FIG. 8 is a schematic diagram of a structure of a packet transmission apparatus according to an embodiment of this application;

FIG. 9 is a schematic diagram of a structure of another packet transmission apparatus according to an embodiment of this application;

FIG. 10 is a schematic diagram of a structure of another packet transmission apparatus according to an embodiment of this application;

FIG. 11 is a schematic diagram of a structure of another packet transmission apparatus according to an embodiment of this application;

FIG. 12 is a schematic diagram of a structure of a packet transmission system according to an embodiment of this application; and FIG. 13 is a schematic diagram of a structure of another packet transmission system according to an embodiment of this application.

DESCRIPTION OF EMBODIMENTS

To enable a person skilled in the art to better understand solutions of this application, the following describes embodiments of this application in more detail with reference to the accompanying drawings and implementations.

In this application, terms such as "first", "second" and "third" are used to distinguish between same items or similar items that have basically same purposes or functions. It should be understood that there is no logical or time-sequential dependency between "first", "second" and "third", and a quantity and an execution sequence are not limited.

The following explains terms in embodiments of this application.

A service request includes an access request or a network allocation request described below.

The access request is a network access request that is initiated by a terminal device and that is forwarded by a UP or another device to a CP. The request is for requesting network access.

The network allocation request is a request for requesting to confirm information about a sliced network. In embodiments of this application, the request may be a request sent by a CP to a USF, or may be a request sent by another device.

An uplink network may be a network such as a core network, a carrier backbone network, or the Internet that is connected to a first device in embodiments of this application.

Embodiments of this application are applied to a communication network. In an example, the communication network may be a communication network scenario in which a control plane and a user plane are separated. In an example, the network may be a broadband access network that includes a BNG system. A BNG serves as a broadband access gateway device, and a user plane and a forwarding plane of the BNG can perform decoupling. The BNG may be divided into a control plane (CP) and the user plane (UP). The CP may be implemented by a physical device or a virtual device having a CP function, and the UP may be implemented by a physical device or a virtual device having a UP function. The CP may manage a plurality of UPs, and schedule users, traffic, resources, and the like on the plurality of UPs.

The following describes embodiments of this application by using a broadband access network scenario as an example. It should be understood that the solutions may also be applied to another network scenario. Details are not described again in embodiments of this application.

Figure 1:
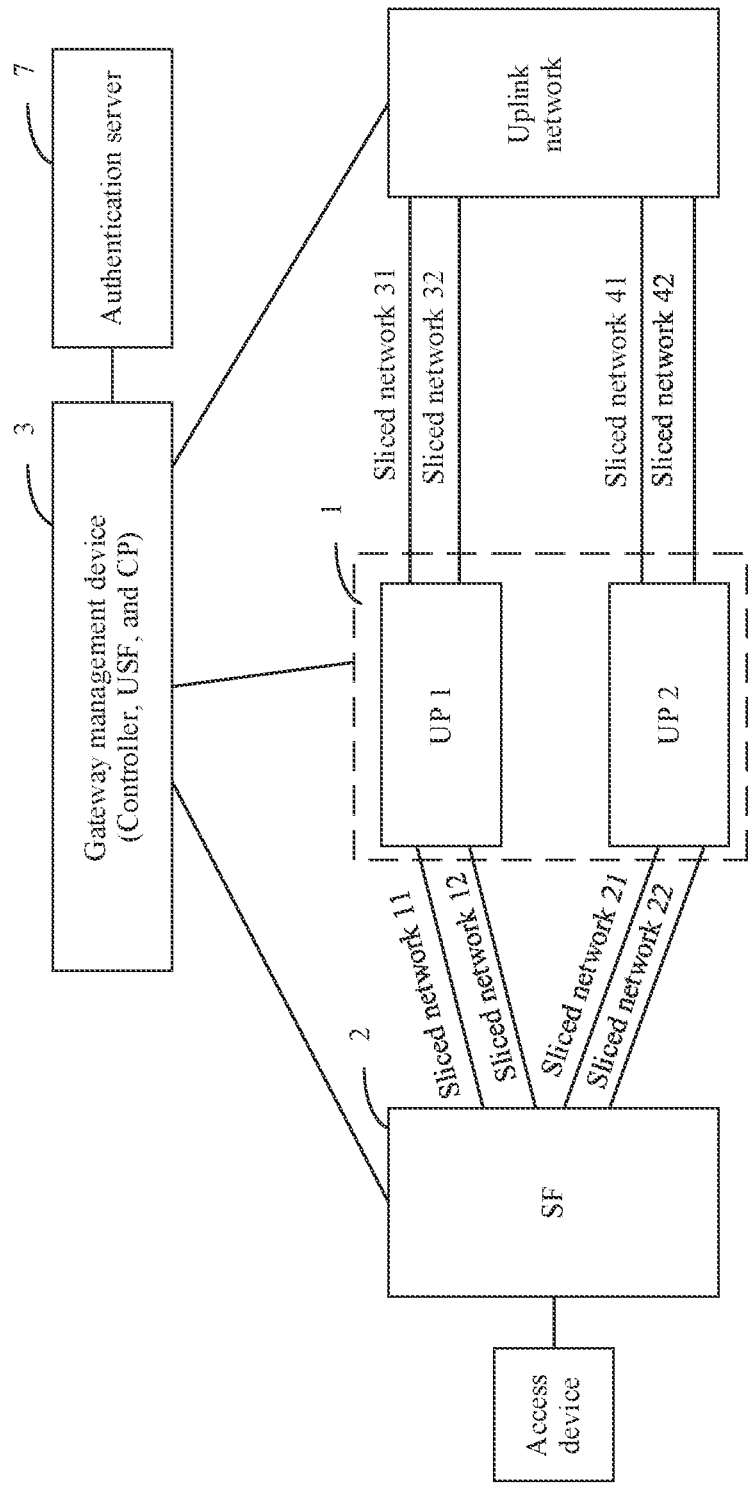
FIG. 1 is a schematic diagram of a structure of a network architecture according to an embodiment of this application.

Refer to FIG. 1. A network architecture includes at least one UP 1, an SF 2, and a gateway management device 3. The gateway management device 3 may set up a network connection to each UP. The SF 2 may also set up a network connection to each UP 1. The SF 2 may be further connected to an access device. Each UP may be further connected to an uplink network. The gateway management device 3 may be a device that has both a USF function and a CP function.

Optionally, the network further includes a controller (not shown in the figure), or the gateway management device further has a controller function, to obtain topology-related information in a broadband access network, for example, connection information of a sliced network between an SF and a UP. When the UP is connected to the uplink network, the UP may be connected to a corresponding provider edge (PE) device or another related device. This is not limited in this application. Optionally, the network further includes an authentication server, and the authentication server may be an independent device. Optionally, the network may not include an independent authentication server. Instead, the gateway management device provides a corresponding authentication service function.

Optionally, refer to FIG. 1. For any one of the at least one UP, at least one sliced network exists between the SF 2 and the UP.

Optionally, the SF 2 and the UP correspond to one or more sliced networks, and each sliced network may correspond to a same SLA level or different SLA levels.

In an example, a sliced network 11 and a sliced network 12 exist between the SF 2 and the UP 1. The sliced network 11 corresponds to a first interface, for example, an interface 1, of the UP 1 and an interface 2 of the SF 2. The sliced network 12 corresponds to an interface 3 of the UP 1 and an interface 4 of the SF 2. The interface may be a physical interface or a virtual interface. In an example, the interface 2 may be an access circuit (AC) interface, the interface 1 may be a user-side virtual Ethernet (VE) interface, the interface 3 may be a network-side VE interface, and the interface 4 may be an interface on a PE device. Optionally, a sliced network 31 and a sliced network 32 exist between the UP 1 and the uplink network. The sliced network 31 corresponds to an interface 5 of the UP 1 and an interface 6 included in a device connected to the uplink network. The sliced network 32 corresponds to an interface 7 of the UP 1 and an interface 7 included in a device connected to the uplink network. The connection herein may be connection through a physical port, or may be connection through a virtual tunnel. This is not limited in this application.

Optionally, the gateway management device 3 may obtain an SLA level corresponding to each sliced network between the SF 2 and the UP, and store, in a first correspondence, a correspondence between a device identifier of the UP, a network identifier of the sliced network, and the SLA level corresponding to the sliced network.

Refer to the example shown in FIG. 1. The sliced network 11 and the sliced network 12 exist between the SF 2 and the UP 1. The sliced network 11 corresponds to an SLA level "Level 1", and the sliced network 12 corresponds to an SLA level "Level 2". A sliced network 21 and a sliced network 22 exist between the SF 2 and a UP 2. The sliced network 21 corresponds to an SLA level "Level 1", and the sliced network 22 corresponds to an SLA level "Level 3". The SLA level may be expressed in a plurality of different manners, such as a level, gold, silver, copper, a low latency, or a low packet loss rate. This is not further limited in this application.

The gateway management device 3 obtains information between the sliced network, the device identifier of the UP, and the SLA level, and stores the related information in the first correspondence shown in Table 1.

TABLE 1

| Device identifier of a UP | Broadband access network-sliced network identifier | SLA level |
|---|---|---|
| E-ID 1 | N-ID 11 | Level 1 |
| E-ID 1 | N-ID 12 | Level 2 |
| E-ID 2 | N-ID 21 | Level 1 |
| E-ID 2 | N-ID 22 | Level 3 |

As shown in Table 1, a device identifier of the UP 1 is E-ID 1, and a device identifier of the UP 2 is E-ID 2. The sliced network 11 (corresponding to a sliced network identifier N-ID 11) between the SF 2 and the UP 1 corresponds to the SLA level "Level 1", and the sliced network 12 (corresponding to a sliced network identifier N-ID 12) between the SF 2 and the UP 1 corresponds to the SLA level "Level 2". The sliced network 21 (corresponding to a sliced network identifier N-ID 21) between the SF 2 and the UP 2 corresponds to the SLA level "Level 1", and the sliced network 22 (corresponding to a sliced network identifier N-ID 22) between the SF 2 and the UP 2 corresponds to the SLA level "Level 3".

Optionally, the correspondence may further store identification information of the SF, to indicate related information of the SF connected to the sliced network.

Optionally, any sliced network between the SF 2 and the UP may be a virtual end-to-end network between the SF 2 and the UP, or may be a physical pipe end-to-end network between the SF 2 and the UP. Optionally, the sliced network may be a tunnel between the SF 2 and the UP. In an example, the tunnel may be a Segment Routing over Internet Protocol version 6 (SRv6) tunnel, for example, may be an SRv6 Ethernet virtual private network (VPN) (EVPN) tunnel.

Optionally, the gateway management device 3 may further obtain an SLA level corresponding to each sliced network between the UP and the uplink network, and store, in a second correspondence, a correspondence between a device identifier of the UP, a network identifier of the sliced network, and the SLA level corresponding to the sliced network.

In the example shown in FIG. 1, the stored second correspondence may be shown in Table 2.

TABLE 2

| Device identifier of a UP | Uplink network-sliced network identifier | SLA level |
|---|---|---|
| E-ID 1 | N-ID 31 | Level 1 |
| E-ID 1 | N-ID 32 | Level 2 |
| E-ID 2 | N-ID 41 | Level 1 |
| E-ID 2 | N-ID 42 | Level 4 |

As shown in Table 2, a device identifier of the UP 1 is E-ID 1, and a device identifier of the UP 2 is E-ID 2. The sliced network 31 and the sliced network 32 exist between the UP 1 and the uplink network. The sliced network 31 corresponds to an identifier N-ID 31 and an SLA level "Level 1", and the sliced network 32 corresponds to an identifier N-ID 32 and an SLA level "Level 2". A sliced network 41 and a sliced network 42 exist between the UP 2 and the uplink network. The sliced network 41 corresponds to an identifier N-ID 41 and an SLA level "Level 1", and the sliced network 42 corresponds to an identifier N-ID 42 and an SLA level "Level 4".

Optionally, the correspondence may further store identification information of a network device in the uplink network, to indicate related information of the network device in the uplink network connected to the sliced network.

Optionally, any sliced network between the UP and the uplink network is a virtual end-to-end network, a physical channel, or the like between the UP and the uplink network. In an example, the sliced network may be a tunnel, for example, an SRv6 tunnel, between the UP and the uplink network.

Figure 2:
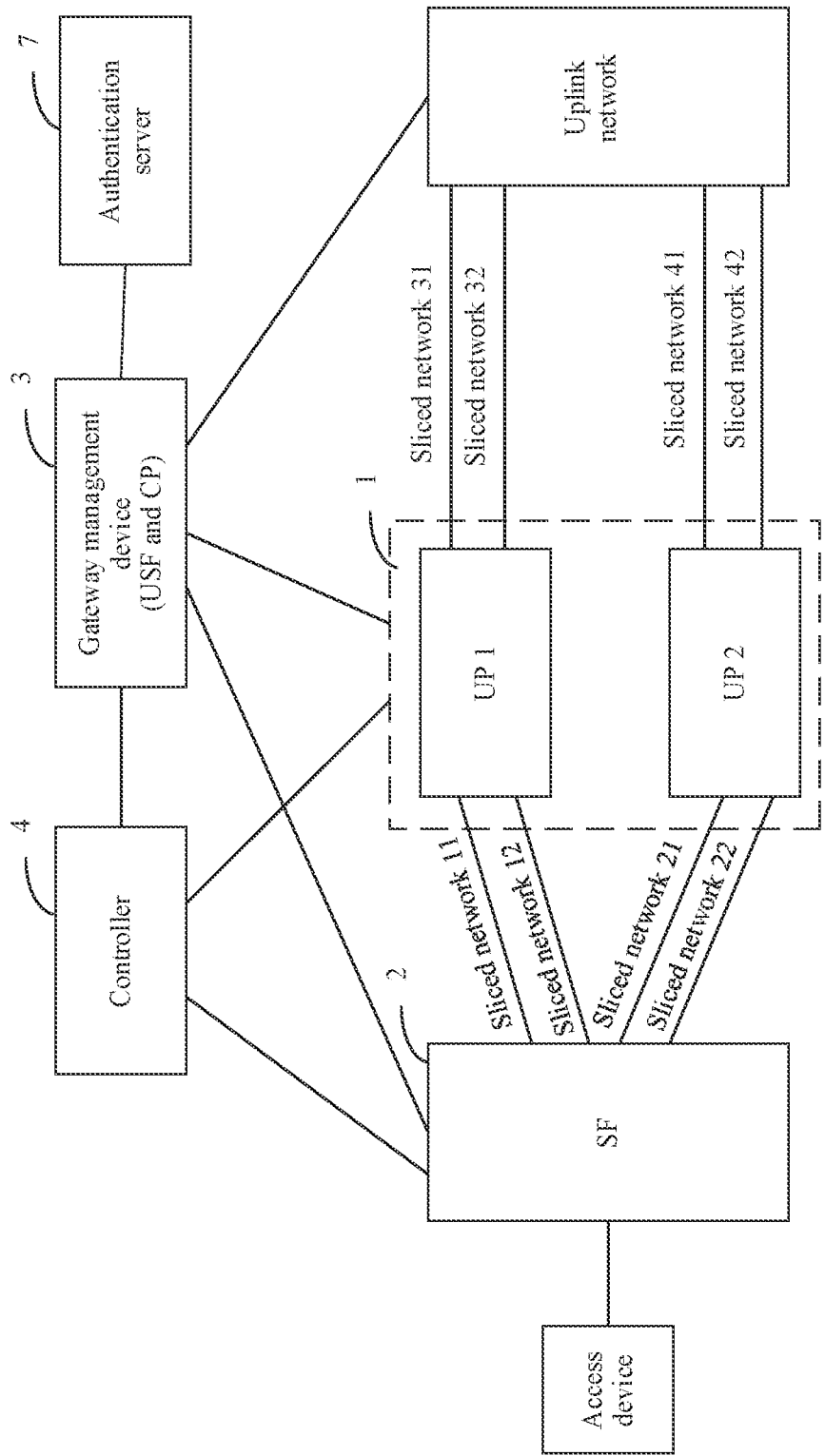
FIG. 2 is a schematic diagram of a structure of another network architecture according to an embodiment of this application.

Optionally, refer to FIG. 2. When the gateway management device 3 is a device integrated with a USF and a CP, the network architecture may further include a controller 4. The first correspondence and the second correspondence may be generated and stored by the controller 4.

When the gateway management device 3 is a device integrated with the USF and the CP, the controller 4 may further send the correspondences to the gateway management device 3, so that the gateway management device 3 can store at least either of the first correspondence and the second correspondence. A manner in which the gateway management device 3 obtains the correspondences includes but is not limited to one or more of the following manners.

Manner 1: Receive the correspondences sent by the controller 4.

Manner 2: An administrator configures the correspondences in the gateway management device 3.

Manner 3: When necessary, the gateway management device 3 may request one or more rows of data in the correspondences from the controller 4.

Figure 3:
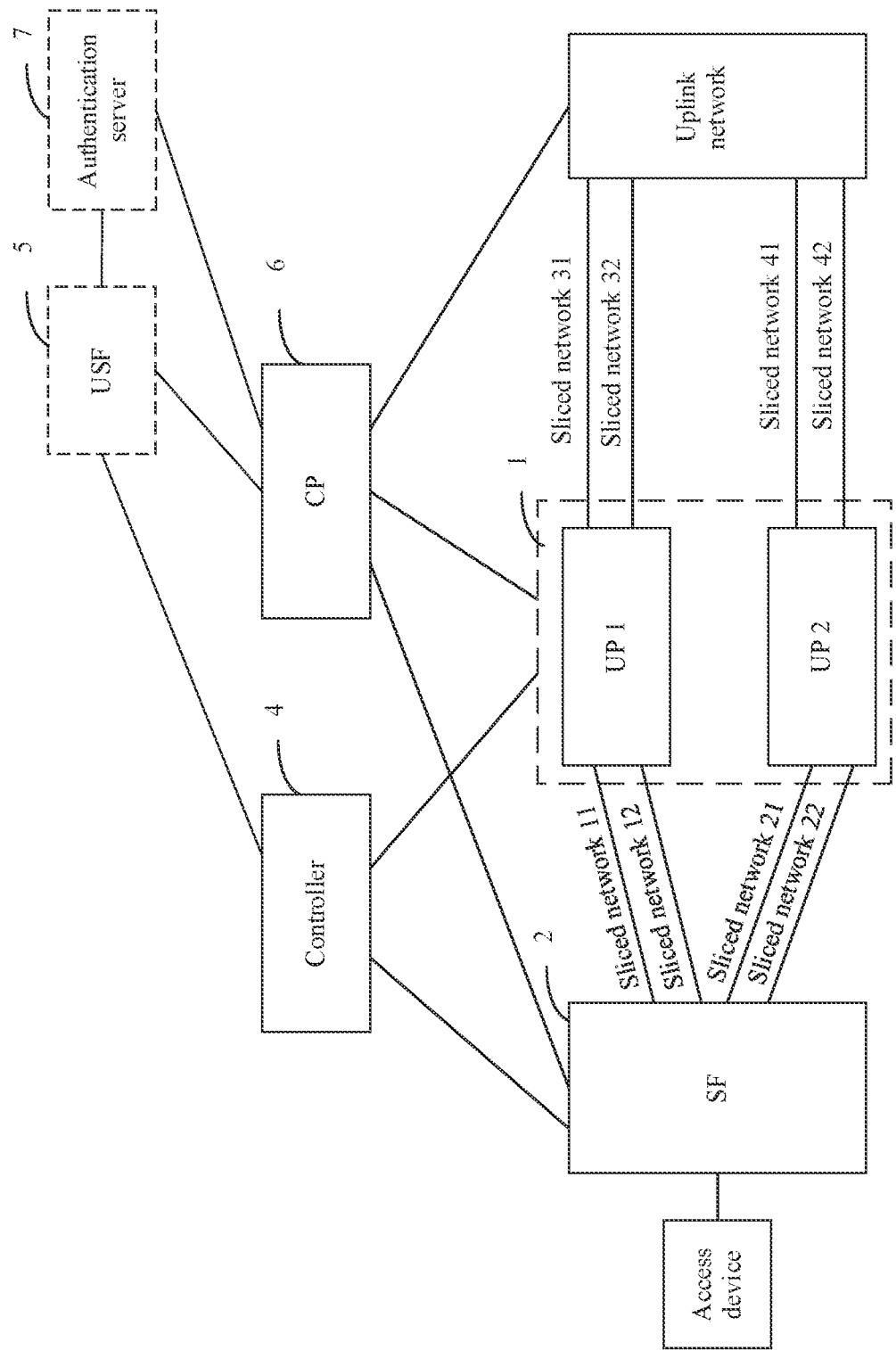
FIG. 3 is a schematic diagram of a structure of another network architecture according to an embodiment of this application.

In another example, refer to a network architecture shown in FIG. 3. Compared with the network architecture shown in FIG. 1 or FIG. 2, in the network architecture shown in FIG. 3, a controller 4, a USF 5, and a CP 6 are all independent devices. The USF 5 sets up a network connection to each of the CP 6 and the controller 4. The CP 6 may also set up a network connection to each UP. Optionally, the CP 6 may also set up a network connection to the controller 4.

In the network architecture shown in FIG. 3, the controller 4 may establish and maintain the first correspondence and the second correspondence.

The controller 4 may further send the correspondences to the USF 5, so that the USF 5 can store at least either of the first correspondence and the second correspondence. Alternatively, the controller 4 may further send the correspondences to the CP 6, so that the CP 6 can store at least either of the first correspondence and the second correspondence.

Optionally, for each UP, the controller 4 may detect an SLA level corresponding to each sliced network between the SF 2 and the UP, and update the first correspondence after an SLA level corresponding to a sliced network changes. In an example, the controller 4 obtains a changed new SLA level, obtains a corresponding SLA level from the first correspondence based on a device identifier of the UP and a network identifier of the sliced network, and updates the obtained SLA level to the new SLA level, to maintain the first correspondence.

Optionally, for each UP, the controller 4 may detect an SLA level corresponding to each sliced network between the UP and the uplink network, and update the second correspondence after an SLA level corresponding to a sliced network changes. In an example, the controller 4 obtains a changed new SLA level, obtains a corresponding SLA level from the second correspondence based on a device identifier of the UP and a network identifier of the sliced network, and updates the obtained SLA level to the new SLA level, to maintain the second correspondence.

Refer to FIG. 4. An embodiment of this application provides an embodiment 400 of a packet transmission method. The method embodiment 400 may be applied to the network architecture shown in FIG. 1. In the network architecture, a gateway management device may be a device integrated with a controller, a USF, and a CP. Alternatively, the method may be applied to the network architecture shown in FIG. 2. In the network architecture, a gateway management device may be a device integrated with a USF and a CP. The method includes the following steps.

S401: A second device sends an access request, where the access request includes service information of a terminal device that is to perform access.

Optionally, the access request may be an access request of a Point-to-Point Protocol over Ethernet (PPPoE) or an access request of a Dynamic Host Configuration Protocol (DHCP).

In an example, the second device is the SF device in FIG. 1 or FIG. 2. The terminal device that is to perform access may be user equipment such as a mobile phone, a computer, or a tablet computer, or the terminal device includes a device such as a residential gateway.

Optionally, the service information may be user information, device information, or the like of the terminal device. In an example, the user information may include information that can indicate a user identity, such as a user identifier or a user account of the terminal device. In another example, the device information may include information such as a device identifier of the terminal device. The device identifier may be a media access control (MAC) address of the terminal device, an identity of the terminal device, or any other information that can indicate an identity of the terminal device.

In this step, when a user needs to access an uplink network through the terminal device, the user needs to send the access request. The access request may be generated by the terminal device, or may be generated by an access device in the network shown in FIG. 1 or FIG. 2. This is not limited in this embodiment of this application.

After receiving the access request, the second device sends the access request. The second device may send the access request to a default device through a default sliced network, and then the default device sends the access request to the gateway management device. In an example, the default device is any UP shown in FIG. 1 or FIG. 2.

S402: The gateway management device receives the access request, and determines a first device and a first sliced network based on the service information included in the access request, and the first sliced network is a sliced network between the first device and the second device.

Optionally, in this step, the gateway management device may perform the following operations of S4021 and S4022. The operations of S4021 and S4022 are as follows.

S4021: The gateway management device obtains, based on the service information, a first SLA level corresponding to the terminal device.

When the service information includes the device information of the terminal device, the gateway management device obtains a user identifier of the terminal device based on the device information, and obtains, based on the user identifier, the first SLA level corresponding to the terminal device. Alternatively, when the service information includes the user information of the terminal device, and the user information includes the user identifier of the terminal device, the gateway management device obtains, based on the user identifier, the first SLA level corresponding to the terminal device.

In an example, the gateway management device obtains a corresponding SLA level from a third correspondence based on the user identifier, and uses the corresponding SLA level as the first SLA level corresponding to the terminal device. The third correspondence is used to store a correspondence between a user identifier of the terminal device and an SLA level. The SLA level corresponding to the terminal device may be negotiated in advance by a user corresponding to the terminal device and a carrier.

Optionally, the third correspondence may be stored in the gateway management device or an authentication server.

When the third correspondence is stored in the gateway management device, the gateway management device directly obtains the corresponding SLA level from the locally stored third correspondence based on the user identifier, and uses the corresponding SLA level as the first SLA level of the terminal device. When the third correspondence is stored in the authentication server, the gateway management device may forward related information of the access request to the authentication server, and the authentication server authenticates the user based on the user identifier, determines the first SLA level corresponding to the user, and sends information about the first SLA level to the gateway management device.

The method embodiment is applied to the network shown in FIG. 1. It is assumed that the default UP is the UP 1. The terminal device sends the access request to the SF, where the access request includes the user identifier of the terminal device. The SF receives the access request, and sends the access request to the UP 1. The UP 1 sends the access request to the gateway management device. The gateway management device learns, based on the user identifier, that the first SLA level of the terminal device is "Level 4".

S4022: The gateway management device determines, based on the first SLA level, a first UP and the first sliced network that meet the first SLA level.

Optionally, the gateway management device obtains, from a first correspondence based on the first SLA level, a network identifier of a sliced network that meets the first SLA level, and uses the network identifier as a network identifier of the first sliced network, obtains, from the first correspondence, a device identifier of a UP that meets the first SLA level, and uses the device identifier as a device identifier of the first UP, and determines the first UP based on the device identifier of the first UP, and determines the first sliced network based on the network identifier of the first sliced network. Optionally, when a plurality of sliced networks have a same SLA level, the gateway management device determines a to-be-selected sliced network in the sliced networks randomly or according to a load status such as balanced load and low load, or determines a to-be-selected sliced network according to a load status such as balanced load and low load of UPs connected to the sliced networks.

Optionally, the first correspondence may be stored in the gateway management device or a controller.

When the first correspondence is stored in the gateway management device, the gateway management device directly obtains, from the locally stored first correspondence based on the first SLA level, the network identifier of the corresponding sliced network, and uses the network identifier as the network identifier of the first sliced network, and obtains the device identifier of the corresponding UP, and uses the device identifier as the device identifier of the first UP. When the first correspondence is stored in the controller, the gateway management device obtains, based on the first SLA level and the device identifier of the first UP, the network identifier of the corresponding sliced network from the first correspondence stored in the controller, and uses the network identifier as the network identifier of the first sliced network, and obtains the device identifier of the corresponding UP, and uses the device identifier as the device identifier of the first UP.

For example, the gateway management device obtains, based on the first SLA level "Level 3", the corresponding network identifier "N-ID 22" from the first correspondence shown in Table 1, and uses the network identifier "N-ID 22" as the network identifier of the first sliced network, obtains the corresponding device identifier "E-ID 2", and uses the device identifier "E-ID 2" as the device identifier of the first UP, and determines, based on the network identifier "N-ID 22" of the first sliced network, that the first sliced network is the sliced network 22, and determines, based on the device identifier "E-ID 2" of the first UP, that the first UP is the UP 2.

Optionally, the gateway management device further determines, based on the device identifier of the first UP and the first SLA level, a third sliced network that meets the first SLA level, where transmission performance of the third sliced network corresponds to transmission performance of the first sliced network. That transmission performance of the third sliced network corresponds to transmission performance of the first sliced network includes but is not limited to the following plurality of cases. Case 1: The transmission performance of the third sliced network is the same as the transmission performance of the first sliced network. Case 2: The transmission performance of the third sliced network is higher than the transmission performance of the first sliced network. Case 3: The transmission performance of the third sliced network is closest to the transmission performance of the first sliced network.

In an example, the gateway management device obtains, from the second correspondence based on the first SLA level and the device identifier of the first UP, a network identifier of a sliced network that meets the first SLA level, and uses the network identifier as a network identifier of the third sliced network, and determines the third sliced network based on the network identifier of the third sliced network.

The second correspondence may be stored in the gateway management device or the controller. When the second correspondence is stored in the gateway management device, the gateway management device directly obtains, from the locally stored second correspondence based on the first SLA level and the device identifier of the first UP, the network identifier of the corresponding sliced network, and uses the network identifier as the network identifier of the third sliced network. When the second correspondence is stored in the controller, the gateway management device obtains, based on the first SLA level and the device identifier of the first UP, the network identifier of the corresponding sliced network from the third correspondence stored in the controller, and uses the network identifier as the network identifier of the third sliced network.

For example, the gateway management device obtains, based on the first SLA level "Level 3" and the device identifier "E-ID 2" of the first UP, the corresponding network identifier "N-ID 42" from the second correspondence shown in Table 2, and uses the network identifier "N-ID 42" as the network identifier of the third sliced network.

S403: The gateway management device sends first interface information to the first device based on the identifier of the first device and the identifier of the first sliced network, where a first interface corresponding to the first interface information is an interface corresponding to the first sliced network on the first device.

In an example, the first interface is an interface corresponding to the first sliced network on the first UP.

In this step, the gateway management device may generate first user entry information based on the device identifier of the first device and the network identifier of the first sliced network, where the first user entry information includes the first interface information. Optionally, the user entry may further include at least one of information such as an address of the terminal device, authorization information for a user accessing the terminal device, and network-side interface information, and send the first user entry information to the first device. In an example, the first interface information may include information such as an interface identifier of the first interface. The network-side interface information includes an interface identifier of a network-side interface. In an example, the network-side interface is an interface corresponding to the third sliced network on the first UP.

Optionally, the address of the terminal device includes at least either of an Internet Protocol (IP) address and a MAC address of the terminal device. In an example, the IP address of the terminal device may be allocated by the gateway management device after information about the user accessing the terminal device is authenticated.

Optionally, the authorization information includes at least one of quality of service (QoS), an access control list (ACL), and the like of the terminal device.

Optionally, the gateway management device may further bind the first sliced network and the third sliced network on the first UP. In an example, the gateway management device may further send a first binding instruction to the first UP, where the first binding instruction includes the network identifier of the first sliced network and the network identifier of the third sliced network, or the first binding instruction includes the first interface information and eighth interface information.

S404: The first device receives the first interface information, generates first forwarding entry information and first routing information based on the first interface information, and advertises the first routing information to the uplink network.

In an example, the first UP receives the first user entry information, generates, based on the first user entry information, the first forwarding entry information and the first routing information corresponding to the terminal device, and advertises the first routing information to the uplink network.

Optionally, the first forwarding entry information may include the address of the terminal device, the interface identifier of the first interface, and the like. After generating the first forwarding entry information, the first UP may store the first forwarding entry information in a forwarding table of the first UP.

Optionally, the first routing information may include information such as the address of the terminal device and the device identifier of the first UP. Optionally, the first routing information may further include the eighth interface information.

After generating the first forwarding entry information of the terminal device, the first UP sets up, by using the forwarding entry, a connection that corresponds to the terminal device and that is between the first UP and the SF. In addition, after sending the first routing information to the uplink network, the first UP sets up a connection that corresponds to the terminal device and is between the uplink network and the first UP. The connection may be a routing channel or a VPN channel.

Optionally, the first UP further receives the first binding instruction sent by the gateway management device, and binds the first sliced network and the third sliced network according to the first binding instruction. In an example, when the first binding instruction includes the network identifier of the first sliced network and the network identifier of the third sliced network, the first UP determines, based on the network identifier of the first sliced network, the first interface corresponding to the first sliced network, determines, based on the network identifier of the third sliced network, an eighth interface corresponding to the third sliced network, and binds the first interface and the eighth interface, to bind the first sliced network and the third sliced network. Alternatively, when the first binding instruction includes the first interface information and third interface information, the first UP determines, based on the first interface information, the first interface corresponding to the first sliced network, determines, based on the eighth interface information, an eighth interface corresponding to the third sliced network, and binds the first interface and the eighth interface, to bind the first sliced network and the third sliced network. After the first sliced network and the third sliced network are bound, a data packet of the terminal device may be transmitted, through the first sliced network, to the third sliced network for transmission, and then transmitted through the third sliced network.

S405: The gateway management device sends a first configuration instruction to the second device, where the first configuration instruction instructs the second device to configure a second interface.

After determining the first sliced network, the gateway management device may determine information about the second interface corresponding to the first sliced network on the second device side. That is, the second interface is an interface of the first sliced network on the SF side. In the network shown in FIG. 1, when the gateway management device has a controller function, the gateway management device may obtain the information about the second interface based on network topology information stored in the gateway management device. In the network shown in FIG. 2, the gateway management device may send a request message to the controller, to obtain the second interface information. After obtaining the second interface information, the gateway management device needs to configure the second interface to transmit the packet of the terminal device.

In an example, the first configuration instruction includes the information about the second interface, and instructs the SF to bind a VLAN corresponding to the identifier of the terminal device and the second interface corresponding to the second interface information.

Optionally, the identifier of the terminal device may be a network identifier of the VLAN corresponding to the terminal device, or the device identifier of the terminal device, where the device identifier may be the address of the terminal device, or the like.

Optionally, the first configuration instruction may further include the user information corresponding to the terminal device, where the user information may include at least one of location information of the terminal device, the network identifier of the VLAN to which the terminal device belongs, and the like.

S406: The second device receives the first configuration instruction, and binds, according to the first configuration instruction, the VLAN corresponding to the identifier of the terminal device and the second interface corresponding to the second interface information.

In an example, the SF determines, based on the identifier of the terminal device, the VLAN to which the terminal device belongs, determines the second interface based on the second interface information, and then binds the VLAN and the second interface. Herein, binding the VLAN and the second interface may also be considered as binding a VLAN ID of the VLAN and the second interface.

The binding the VLAN and the second interface means that the SF stores a correspondence between the network identifier of the VLAN and an interface identifier of the second interface. In this way, the VLAN corresponding to the packet of the terminal device is associated with the first sliced network, so that the packet of the terminal device can be transmitted through the first sliced network.

After this step is performed, in the communication network, a first packet of the terminal device may be transmitted through the first sliced network. The first packet includes a first uplink packet and a first downlink packet, and may further include another packet sent or received by the terminal device.

With reference to the network shown in FIG. 1 or FIG. 2, the following describes an example of a transmission process of the first uplink packet and the first downlink packet.

When the terminal device sends the first uplink packet, the access device shown in FIG. 1 may include a corresponding VLAN in the first uplink packet. The SF receives the first uplink packet through a second interface corresponding to the VLAN, and forwards the first uplink packet through the second interface. Because the second interface and the first sliced network are bound, the SF sends the first uplink packet to the first UP through the first sliced network. In an example, the SF obtains, based on a network identifier of the VLAN, an interface identifier of the second interface from a correspondence between the network identifier and the interface identifier, and sends the first uplink packet through the second interface corresponding to the interface identifier of the second interface, to send the first uplink packet to the first UP through the first sliced network. The first UP receives the first uplink packet, and sends the first uplink packet to the uplink network.

When the first sliced network and the third sliced network are further bound, the first UP determines the third sliced network bound to the first sliced network, and sends the first uplink packet to the uplink network through the third sliced network. In an example, the first UP receives the first uplink packet through a first interface, determines a third interface bound to the first interface, and sends the first uplink packet through the third interface, to send the first uplink packet to the uplink network through the third sliced network.

When the uplink network receives the first downlink packet sent to the terminal device, for example, if a destination address of the first downlink packet is an IP address of the terminal device, the uplink network obtains first routing information including the address of the terminal device, where the first routing information includes a device identifier of the first UP, and sends the first downlink packet to the first UP based on the device identifier. Optionally, when the first routing information further includes fourth interface information, the uplink network sends the first downlink packet to the first UP through a fourth interface corresponding to the fourth interface information, to send the first downlink packet to the first UP through the third sliced network.

The first UP receives the first downlink packet, and sends the first downlink packet to the SF through the first sliced network. In an example, the first UP obtains first forwarding entry information of the terminal device from a forwarding table based on the address of the terminal device in the first downlink packet, where the first forwarding entry information includes an interface identifier of the first interface corresponding to the first sliced network, and sends the first downlink packet through the first interface corresponding to the interface identifier of the first interface. The SF receives the first downlink packet, and sends the first downlink packet to the terminal device.

In the foregoing descriptions, the first sliced network may be a tunnel between the first device and the second device, so that the packet of the terminal may exclusively occupy a resource of the tunnel. In addition, the tunnel meets a requirement of the first SLA level of the terminal. Therefore, a network performance requirement of the terminal device between the first device and the second device is ensured through the first sliced network.

The third sliced network may be a tunnel between the first device and the uplink network. The packet of the terminal may exclusively occupy a resource of the tunnel. The performance of the first sliced network corresponds to the performance of the third sliced network. Therefore, the third sliced network also meets the requirement of the first SLA of the terminal. In this way, a network performance requirement of the terminal device between the first device and the uplink network is also ensured through the third sliced network.

An execution order of S403 and S405 is not limited above. That is, S403 may be performed before S405, or may be performed after S405.

Optionally, an SLA level of the terminal device changes. For example, the user corresponding to the terminal device re-signs an SLA level with the carrier. It is assumed that the SLA level of the terminal device changes from the first SLA to a second SLA level. In this case, the gateway management device may confirm the change of the SLA level, or receive a control message sent by the authentication server, where the control message indicates that the SLA level of the user corresponding to the terminal device is the second SLA level. The gateway management device receives the control message, and determines, based on the second SLA level, the second sliced network that meets the second SLA level and the third device whose function is equivalent to that of the first device. In an example, the third device is a second UP, and the second sliced network is a sliced network between the second UP and an SF 3. In addition, the gateway management device may further control a second packet of the terminal device to be transmitted through the second sliced network, to steer traffic of the terminal device from the first sliced network to the second sliced network.

A solution in which the gateway management device determines the second sliced network and the third device based on the second SLA level is similar to the foregoing manner of determining the first sliced network and the first device. Details are not described herein again in this embodiment of this application. A manner in which the gateway management device may control the second packet of the terminal device to be transmitted through the second sliced network is similar to a manner in which the gateway management device controls the first packet of the terminal device to be transmitted through the first sliced network. Details are not described herein again in this application. After this step, the communication network may further steer the traffic of the terminal device from the first sliced network to the second sliced network. In this case, the gateway management device may indicate the second device to release a binding relationship between the VLAN to which the terminal device belongs and the first sliced network, that is, indicate the second device to delete a correspondence between the interface identifier of the first interface and the network identifier of the VLAN.

Optionally, the gateway management device indicates the first device to delete the first forwarding entry information.

Optionally, the gateway management device further indicates the first device to release a binding relationship between the first sliced network and the third sliced network.

After this step is performed, the second packet of the terminal device may be controlled to be transmitted through the second sliced network. The second packet is a packet sent or received by the terminal device after this step is performed.

In this embodiment of this application, the gateway management device receives the access request, obtains the first SLA level of the terminal device based on the service information of the terminal device included in the access request, determines the first device and the first sliced network that meet the first SLA level, sends the first user entry information to the first device based on the device identifier of the first device and the network identifier of the first sliced network, and sends the configuration instruction to the second device, so that the second device and the first device transmit the packet of the terminal device through the first sliced network. Because the first sliced network is a tunnel between the first device and the first device, the packet of the terminal may exclusively occupy the resource of the tunnel. In addition, the tunnel meets a requirement of the first SLA level of the terminal. Therefore, the network performance requirement of the terminal device between the second device and the first device is ensured through the first sliced network.

Refer to FIG. 5A and FIG. 5B. An embodiment of this application provides a packet transmission method 500. The method 500 may be applied to the communication network shown in FIG. 3. The communication network shown in FIG. 3 is consistent with the communication network architecture shown in FIG. 1 and FIG. 2. A main difference includes that a gateway management device may be divided into two independent devices: a USF and a CP. In an example, the second device is the SF shown in FIG. 3, and the first device may be the UP 1 shown in FIG. 3.

The method includes the following steps.

Step 501: A second device receives an access request, and sends the access request to a CP, where the access request includes service information of a terminal device that is to perform access.

Optionally, the service information may be user information, device information, or the like of the terminal device.

Optionally, the user information may include information such as a user identifier of the terminal device, where the user identifier may be a user account registered by a user corresponding to the terminal device, or the like.

Optionally, the device information may include information such as a device identifier of the terminal device, where the device identifier may be an address of the terminal device, or the like.

In an embodiment, when the terminal device needs to access an uplink network, the terminal device sends the access request to an SF, where the access request includes the service information of the terminal device. The SF sends the access request to a default UP. The default UP receives the access request, and sends the access request to the CP.

Step 502: The CP receives the access request, and obtains a first SLA level based on the service information of the terminal device included in the access request.

Optionally, for a detailed implementation process in which the CP obtains the first SLA level, refer to the detailed implementation process in which the gateway management device obtains the first SLA level in 4021 in the embodiment shown in FIG. 4. Details are not described herein again.

Step 503: The CP sends a network allocation request to a USF, where the network allocation request includes the first SLA level.

Step 504: The USF receives the network allocation request, and determines, based on the first SLA level included in the network allocation request, a first device and a first sliced network that meet the first SLA level, and the first sliced network is a sliced network between the first device and the second device.

Optionally, for a detailed implementation process in which the CP determines the first device and the first sliced network, refer to the detailed implementation process in which the gateway management device determines the first device and the first sliced network in 4021 and 4022 in the embodiment shown in FIG. 4. Details are not described herein again.

Step 505: The USF sends a first configuration instruction to the CP, where the first configuration instruction includes a device identifier of the first device and a network identifier of the first sliced network.

Step 506: The CP receives the first configuration instruction, and sends first user entry information of the terminal device to the first device based on the device identifier of the first device and the network identifier of the first sliced network, where the first user entry information includes first interface information, and a first interface corresponding to the first interface information is an interface corresponding to the first sliced network on the first device. The first interface is an interface of the first sliced network on the first device side.

Optionally, for a detailed implementation process in which the CP sends the first user entry information of the terminal device to the first device based on the device identifier of the first device and the network identifier of the first sliced network, refer to the detailed implementation process in which the gateway management device sends the first user entry information of the terminal device to the first device based on the device identifier of the first device and the network identifier of the first sliced network in 403 in the embodiment shown in FIG. 4. Details are not described herein again.

Optionally, after sending the first user entry information, the CP sends a first configuration response to the USF.

Step 507 is the same as step 404 in the method embodiment 400. Details are not described herein again.

Step 508: The USF sends a first steering instruction to a controller, where the first steering instruction includes the user information of the terminal device, the device identifier of the first UP, and the network identifier of the first sliced network.

Optionally, when receiving the first configuration response of the CP, the USF sends the first steering instruction to the controller. The steering instruction may also be referred to as a configuration instruction.

Step 509: The controller receives the first steering instruction, and sends a second steering instruction to the second device based on the device identifier of the first device and the network identifier of the first sliced network that are included in the first steering instruction, where the second steering instruction includes an identifier of the terminal device and second interface information.

Optionally, for a detailed implementation process in which the controller sends the second steering instruction to the second device based on the device identifier of the first device and the network identifier of the first sliced network, refer to the detailed implementation process in which the gateway management device sends the configuration instruction to the second device based on the device identifier of the first device and the network identifier of the first sliced network in S405 in the embodiment shown in FIG. 4. Details are not described herein again.

Step 510: The second device receives the second steering instruction, and binds, according to the second steering instruction, a VLAN corresponding to the identifier of the terminal device and a second interface corresponding to the second interface information.

Optionally, for a detailed implementation process in which the second device binds the VLAN and the second interface, refer to the detailed implementation process in which the SF binds the VLAN and the second interface in S406 in the embodiment shown in FIG. 4. Details are not described herein again.

Optionally, an SLA level of the terminal device changes. For example, the user corresponding to the terminal device re-signs an SLA level with a carrier. It is assumed that the SLA level of the terminal device changes from the first SLA to a second SLA level. In this case, an authentication server sends a control message to the USF, where the control message includes the second SLA level.

The USF receives the control message, or the USF determines the second SLA level in another manner. The USF determines, based on the second SLA level, a third device and a second sliced network that meet the second SLA level. In an example, the second sliced network is a sliced network between a second UP and the second device. A second packet of the terminal device is controlled to be transmitted through the second sliced network, so that traffic of the terminal device is steered from the first sliced network to the second sliced network.

A solution in which the USF determines the second sliced network and the third device based on the second SLA level is similar to the foregoing manner of determining the first sliced network and the first device. Details are not described herein again in this embodiment of this application. A manner in which the USF may control the second packet of the terminal device to be transmitted through the second sliced network is similar to a manner in which the gateway management device controls the first packet of the terminal device to be transmitted through the first sliced network. Details are not described herein again in this application. After this step, the communication network may further steer the traffic of the terminal device from the first sliced network to the second sliced network. In this case, the USF may indicate the second device to release a binding relationship between the VLAN to which the terminal device belongs and the first sliced network, that is, indicate the second device to delete a correspondence between an interface identifier of the first interface and a network identifier of the VLAN.

Refer to FIG. 6A and FIG. 6B. A packet transmission method 600 provided in an embodiment of this application is provided. The method 600 may be applied to the communication network shown in FIG. 1, FIG. 2, or FIG. 3. The method embodiment 600 may be a specific implementation of the foregoing method embodiment 400 and the foregoing method embodiment 500. The method includes the following steps.

S601: A software-defined networking (SDN) controller sends information about a sliced network between an SF and a UP to a USF.

S602: A residential gateway (RG) sends an access request, where the request may include a dial-up request of a PPPoE or a DHCP.

S603: The SF forwards a packet to a UP 1 through a default slice.

S604: The UP 1 receives the dial-up request of the user, and may transmit the packet to a CP through a control packet redirection interface (CPRi) between the CP and the UP, for example, a virtual extensible local area network generic packet encapsulation (VxLAN-GPE) interface.

S605: The CP requests a target sliced network and a target UP from the USF based on an SLA level of the user.

S606: The USF selects the target UP and the target sliced network based on the SLA.

S607: The USF sends a UP 2 and a low-latency sliced network 2 to the CP.

S608: The CP selects an address pool corresponding to the UP 2, to allocate an IP address to the user.

S609: The CP delivers a user entry to the UP 2.

S610: The CP notifies the USF that the user entry is successfully created.

S611: The USF notifies the SDN controller to steer the user.

S612: The SDN delivers an instruction to the SF, to steer the user to the corresponding sliced network and UP.

S613: The user accesses the internet through the UP 2 and the sliced network 2.

In the foregoing descriptions, S601 may be performed before or after any one of steps S602 to S605.

The method embodiment shown in FIG. 6A and FIG. 6B is merely a simple example. For detailed steps and actions performed by each device, refer to the descriptions in the foregoing embodiment 400 or the foregoing embodiment 500. Details are not described herein again in this embodiment of this application.

When a user changes an SLA package, and an original sliced network and an original UP do not meet an SLA requirement, a USF steers the user online.

Refer to FIG. 7. A packet transmission method 700 provided in an embodiment of this application is provided. The method 700 may be applied to the communication network shown in FIG. 1, FIG. 2, or FIG. 3. The method embodiment 700 may implement a specific implementation in which a USF steers a user online after the user changes an SLA in the foregoing method embodiment 600. The method 700 includes the following steps.

S701: An SDN controller reports information about a sliced network between an SF and a UP to a USF.

S702: An authentication server dynamically modifies an SLA level of a user by using a COA message.

S705: The CP requests a target sliced network and a target UP from the USF based on a changed SLA level of the user.

S706: The USF selects a target UP 3 and a target sliced network 3 based on the SLA.

S707: The USF sends a UP 2 and a low-latency sliced network 2 to the CP.

S709: The CP selects the sliced network 3 of the UP 3 for user access, and delivers a user entry.

S710: The CP notifies the USF that the user entry is successfully created.

S711: The USF notifies the SDN controller to steer the user.

S712: The SDN delivers an instruction to the SF, to steer the user to the corresponding sliced network and UP.

S713: The user accesses the internet through the UP 3 and the sliced network 3.

In the foregoing descriptions, S701 may be performed before or after any one of steps S702 to S705.

The method embodiment 700 shown in FIG. 7 is merely a simple example. For detailed steps and actions performed by each device, refer to the descriptions in the foregoing embodiment 400, the foregoing embodiment 500, or the foregoing embodiment 600. Details are not described herein again in this embodiment of this application.

The foregoing describes the method 400, the method 500, the method 600, and the method 700 in embodiments of this application. The following describes a packet transmission apparatus 800 in embodiments of this application. The packet transmission apparatus 800 described below has any function of the gateway management device or the USF in the method 400, the method 500, the method 600, or the method 700.

FIG. 8 is a schematic diagram of a structure of a packet transmission apparatus 800 according to an embodiment of this application. As shown in FIG. 8, the apparatus 800 includes a receiving module 801 configured to perform S402, S504, the step of receiving the service request in the foregoing plurality of methods, or related content, a processing module 802 configured to perform S4021, S4022, S504, the step of determining the UP and the sliced network in the foregoing plurality of methods, or related content, and a sending module 803 configured to perform S403, S405, S505, S508, the step of sending the UP and the sliced network in the foregoing plurality of methods, or related content.

The apparatus 800 corresponds to the gateway management device or the USF in the foregoing method embodiments. The modules and the foregoing other operations and/or functions in the apparatus 800 are used to implement various steps and methods implemented by the gateway management device or the USF in the method embodiments. For specific details, refer to the method 400, the method 500, the method 600, or the method 700. For brevity, details are not described herein again.

When the apparatus 800 processes a packet, division into the foregoing functional modules is used as an example for description. During actual application, the foregoing functions may be allocated to different functional modules for implementation based on a requirement, in other words, an internal structure of the apparatus 800 is divided into different functional modules, to implement all or some of the functions described above. In addition, the apparatus 800 provided in the foregoing embodiment and the method 400, the method 500, the method 600, or the method 700 are based on a same concept. For a specific implementation process of the apparatus 800, refer to descriptions of the foregoing methods. Details are not described herein again.

FIG. 9 is a schematic diagram of a structure of a packet transmission apparatus 900 according to an embodiment of this application. As shown in FIG. 9, the apparatus 900 includes a receiving module 901 configured to perform S502 or S506, a processing module 902 configured to perform S502, and a sending module 503 configured to perform S503 or S507.

The apparatus 900 corresponds to the CP in the foregoing method embodiments. The modules and the foregoing other operations and/or functions in the apparatus 900 are used to implement various steps and methods implemented by the CP in the method embodiments. For specific details, refer to related descriptions of the CP in the method 500, the method 600, or the method 700. For brevity, details are not described herein again.

When the apparatus 900 processes a packet, division into the foregoing functional modules is used as an example for description. During actual application, the foregoing functions may be allocated to different functional modules for implementation based on a requirement, in other words, an internal structure of the apparatus 900 is divided into different functional modules, to implement all or some of the functions described above. In addition, the apparatus 900 provided in the foregoing embodiment and the method 500 are based on a same concept. For a specific implementation process of the apparatus 900, refer to related descriptions of the CP in the method 500, the method 600, or the method 700. Details are not described herein again.

In correspondence to the method embodiments and the virtual apparatus embodiment provided in this application, an embodiment of this application further provides a packet transmission apparatus. The following describes a hardware structure of the apparatus.

A packet transmission apparatus 1000 or a packet transmission apparatus 1100 described below corresponds to the gateway management device, the USF, or the CP in the foregoing method embodiments. Hardware and modules in the apparatus 1000 or the apparatus 1100 and the foregoing other operations and/or functions are used to implement various steps and methods implemented by the apparatus 1000 or the apparatus 1100 in the method embodiments. For specific details of a detailed procedure about how the apparatus 1000 or the apparatus 1100 forwards a packet, refer to the foregoing method embodiments. For brevity, details are not described herein again. The foregoing steps of the method 400, the method 500, the method 600, or the method 700 may be completed by using a hardware integrated logic circuit in a processor of the apparatus 1000 or the apparatus 1100 or instructions in a form of software. The steps in the methods disclosed with reference to embodiments of this application may be directly performed and completed by a hardware processor, or may be performed and completed by using a combination of hardware in the processor and a software module. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in a memory, and the processor reads information in the memory and completes the steps in the foregoing methods in combination with the hardware of the processor. To avoid repetition, details are not described herein again.

The apparatus 1000 or the apparatus 1100 corresponds to the apparatus 800 or the apparatus 900 in the foregoing virtual apparatus embodiment, and each functional module in the apparatus 800 or the apparatus 900 is implemented by using software of the apparatus 1000 or the apparatus 1100. In other words, the functional modules included in the apparatus 800 or the apparatus 900 are generated after the processor of the apparatus 1000 or the apparatus 1100 reads program code stored in the memory.

FIG. 10 is a schematic diagram of a structure of an apparatus 1000 according to an example embodiment of this application. The apparatus 1000 may be configured as a gateway management device, a USF, or a CP. The apparatus 1000 may be implemented by a general bus architecture.

The apparatus 1000 includes at least one processor 1001, a communication bus 1002, a memory 1003, and at least one communication interface 1004.

The processor 1001 may be a general-purpose CPU, an NP, a microprocessor, or may be one or more integrated circuits configured to implement the solutions of this application, for example, an application-specific integrated circuit (ASIC), a programmable logic device (PLD), or a combination thereof. The PLD may be a complex PLD (CPLD), a field-programmable logic gate array (FPGA), a generic array logic (GAL), or any combination thereof.

The communication bus 1002 is configured to transmit information between the foregoing components. The communication bus 1002 may be classified into an address bus, a data bus, a control bus, and the like. For ease of representation, only one thick line is used to represent the bus in the figure, but this does not mean that there is only one bus or only one type of bus.

The memory 1003 may be a ROM or another type of static storage device capable of storing static information and instructions, or may be a RAM or another type of dynamic storage device capable of storing information and instructions, or may be an EEPROM, a compact disc (CD) ROM (CD-ROM) or other compact disc storage, optical disc storage (including a compressed optical disc, a laser disc, an optical disc, a DIGITAL VERSATILE DISC (DVD), a BLU-RAY disc, or the like), a magnetic disk storage medium or another magnetic storage device, or any other medium capable of carrying or storing expected program code in a form of instructions or a data structure and capable of being accessed by a computer. This is not limited thereto. The memory 1003 may exist independently, and be connected to the processor 1001 by using the communication bus 1002. Alternatively, the memory 1003 may be integrated with the processor 1001.

The communication interface 1004 is configured to communicate with another device or a communication network through any apparatus such as a transceiver. The communication interface 1004 includes a wired communication interface, and may further include a wireless communication interface. The wired communication interface may be, for example, an ethernet interface. The ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 1001 may include one or more central processing units (CPUs), such as a CPU 0 and a CPU 1 shown in FIG. 10.

During specific implementation, in an embodiment, the apparatus 1000 may include a plurality of processors, such as the processor 1001 and a processor 1005 in FIG. 10. Each of the processors may be a single-core processor (single-CPU), or may be a multi-core processor (multi-CPU). The processor herein may refer to one or more devices, circuits, and/or processing cores configured to process data (for example, computer program instructions).

During specific implementation, in an embodiment, the apparatus 1000 may further include an output device 1006 and an input device 1007. The output device 1006 communicates with the processor 1001, and may display information in a plurality of manners. For example, the output device 1006 may be a liquid-crystal display (LCD), a light-emitting diode (LED) display device, a cathode-ray tube (CRT) display device, or a projector. The input device 1007 communicates with the processor 1001, and may receive an input from a user in a plurality of manners. For example, the input device 1007 may be a mouse, a keyboard, a touchscreen device, or a sensing device.

In some embodiments, the memory 1003 is configured to store program code 1010 for executing the solutions in this application, and the processor 1001 may execute the program code 1010 stored in the memory 1003. In other words, the apparatus 1000 may implement, by using the processor 1001 and the program code 1010 in the memory 1003, the method 400 or the method 500 provided in the method embodiments.

The apparatus 1000 in this embodiment of this application may correspond to the gateway management device, the USF, or the CP in the foregoing method embodiments. In addition, the processor 1001, the communication interface 1004, and the like in the apparatus 1000 may implement functions of the gateway management device, the USF, or the CP and/or various steps and methods implemented by the gateway management device, the USF, or the CP in the foregoing method embodiments. For brevity, details are not described herein again.

The receiving module 801 and the sending module 803 in the apparatus 800 are equivalent to the communication interface 1004 in the apparatus 1000, and the processing module 802 in the apparatus 800 may be equivalent to the processor 1001 in the apparatus 1000.

The receiving module 901 in the apparatus 900 is equivalent to the communication interface 1004 in the apparatus 1000, and the processing module 902 in the apparatus 900 may be equivalent to the processor 1001 in the apparatus 1000.

In some embodiments, the apparatus 1000 includes a processor. The processor is configured to execute a computer program or instructions, to implement the method 400, the method 500, the method 600, or the method 700 provided in the method embodiments.

FIG. 11 is a schematic diagram of a structure of an apparatus 1100 according to an example embodiment of this application. The apparatus 1100 may be configured as a gateway management device, a USF, or a CP. The apparatus 1100 includes a main control board 1110 and an interface board 1130.

The main control board 1110 is also referred to as a main processing unit (MPU) or a route processor card. The main control board 1110 is configured to control and manage components in the apparatus 1100, including functions of route computation, device management, device maintenance, and protocol processing. The main control board 1110 includes a central processing unit 1111 and a memory 1112.

The interface board 1130 is also referred to as a line processing unit (LPU), a line card, or a service board. The interface board 1130 is configured to provide various service interfaces, and forward a data packet. The service interface includes but is not limited to an ethernet interface, a Packet over Synchronous Optical Networking (SONET)/Synchronous Digital Hierarchy (SDH) (POS) interface, and the like. The ethernet interface is, for example, a flexible Ethernet service interface (or Flexible Ethernet Clients (FlexE) Clients). The interface board 1130 includes a central processing unit 1131, a network processor 1132, a forwarding entry memory 1134, and a physical interface card (PIC) 1133.

The central processing unit 1131 on the interface board 1130 is configured to control and manage the interface board 1130, and communicate with the central processing unit 1111 on the main control board 1110.

The network processor 1132 is configured to implement packet forwarding processing. A form of the network processor 1132 may be a forwarding chip. Further, the network processor 1132 is configured to forward a received packet based on a forwarding table stored in the forwarding entry memory 1134. If a destination address of the packet is an address of the apparatus 1100, the network processor 1132 sends the packet to a CPU (for example, the central processing unit 1111) for processing. If a destination address of the packet is not an address of the apparatus 1100, the network processor 1132 searches for, based on the destination address, a next hop and an outbound interface corresponding to the destination address in the forwarding table, and forwards the packet to the outbound interface corresponding to the destination address. Uplink packet processing includes packet ingress interface processing and forwarding table searching, and downlink packet processing includes forwarding table searching and the like.

The physical interface card 1133 is configured to implement an interconnection function at a physical layer. Original traffic enters the interface board 1130 from the physical interface card 1133, and a processed packet is sent from the physical interface card 1133. The physical interface card 1133, also referred to as a subcard, may be installed on the interface board 1130, and is responsible for converting an optical/electrical signal into a packet, performing validity check on the packet, and forwarding the packet to the network processor 1132 for processing. In some embodiments, the central processing unit may alternatively perform a function of the network processor 1132, for example, implement software forwarding based on a general-purpose CPU. Therefore, the network processor 1132 is not necessary in the physical interface card 1133.

Optionally, the apparatus 1100 includes a plurality of interface boards. For example, the apparatus 1100 further includes an interface board 1140. The interface board 1140 includes a central processing unit 1141, a network processor 1142, a forwarding entry memory 1144, and a physical interface card 1143.

Optionally, the apparatus 1100 further includes a switching board 1120. The switching board 1120 may also be referred to as a switch fabric unit (SFU). When the apparatus 1100 has a plurality of interface boards 1130, the switching board 1120 is configured to complete data exchange between the interface boards. For example, the interface board 1130 and the interface board 1140 may communicate with each other by using the switching board 1120.

The main control board 1110 is coupled to the interface board 1130. For example, the main control board 1110, the interface board 1130 and the interface board 1140, and the switching board 1120 are connected to a system backboard by using a system bus for interworking. In a possible implementation, an inter-process communication (IPC) channel is established between the main control board 1110 and the interface board 1130, and the main control board 1110 and the interface board 1130 communicate with each other through the IPC channel.

Logically, the apparatus 1100 includes a control plane and a forwarding plane. The control plane includes the main control board 1110 and the central processing unit 1131. The forwarding plane includes components used for forwarding, for example, the forwarding entry memory 1134, the physical interface card 1133, and the network processor 1132. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

If the apparatus 1100 is configured as the gateway management device or the USF, the physical interface card 1133 receives a service request, where the service request includes service information of a terminal device that is to perform access, and sends the service request to the network processor 1132. The network processor 1132 determines a first device and a first sliced network based on the service information of the terminal device, where the first sliced network is a sliced network between the first device and a second device, the service request is forwarded by the second device, and the first sliced network is used to transmit a data packet of the terminal device.

If the apparatus 1100 is configured as the CP, the physical interface card 1133 receives an access request, where the access request includes a user identifier of a terminal device that is to perform access, and sends the access request to the network processor 1132. The network processor 1132 obtains a first SLA level of the terminal device based on the user identifier, and sends a network allocation request through the physical interface card 1133, where the network allocation request includes the first SLA level, the network allocation request is used by the USF to determine a first device and a first sliced network based on the first SLA level, the first sliced network is a sliced network between the first device and a second device, the access request is forwarded by the second device, and the first sliced network is used to transmit a data packet of the terminal device.

The receiving module 801 and the sending module 803 in the apparatus 800 are equivalent to the physical interface card 1133 in the apparatus 1100, and the processing module 802 in the apparatus 800 may be equivalent to the network processor 1132 or the central processing unit 1111.

The receiving module 901 and the sending module 903 in the apparatus 900 are equivalent to the physical interface card 1133 in the apparatus 1100, and the processing module 902 in the apparatus 900 may be equivalent to the network processor 1132 or the central processing unit 1111.

Operations performed on the interface board 1140 are consistent with the operations performed on the interface board 1130 in this embodiment of this application. For brevity, details are not described again. The apparatus 1100 in this embodiment may correspond to the gateway management device, the USF, or the CP in the foregoing method embodiments. The main control board 1110 and the interface boards 1130 and/or 1140 in the apparatus 1100 may implement functions of the gateway management device, the USF, or the CP and/or various steps implemented by the gateway management device, the USF, or the CP in the foregoing method embodiments. For brevity, details are not described again.

It should be noted that, there may be one or more main control boards, and when there is a plurality of main control boards, the main control boards may include an active main control board and a standby main control board. There may be one or more interface boards, and an apparatus 1100 having a stronger data processing capability provides more interface boards. There may also be one or more physical interface cards on the interface board. There may be no switching board or one or more switching boards. When there is a plurality of switching boards, load balancing and redundancy backup may be implemented together. In a centralized forwarding architecture, the apparatus 1100 may not need the switching board, and the interface board provides a function of processing service data of an entire system. In a distributed forwarding architecture, the apparatus 1100 may include at least one switching board. Data exchange between a plurality of interface boards is implemented by using the switching board, to provide a large-capacity data exchange and processing capability. Therefore, a data access and processing capability of the apparatus 1100 in the distributed architecture is better than that of the device in the centralized architecture. Optionally, the apparatus 1100 may alternatively be in a form in which there is only one card. In an example, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, an apparatus 1100 such as a low-end switch or a router) has a low data exchange and processing capability. A specific architecture that is to be used depends on a specific networking deployment scenario. This is not limited herein.

In some possible embodiments, the gateway management device, the USF, or the CP may be implemented as a virtualized device.

For example, the virtualized device may be a virtual machine (VM) on which a program having a packet sending function is run, and the virtual machine is deployed on a hardware device (for example, a physical server). The virtual machine refers to a complete software-simulated computer system that has complete hardware system functions and that runs in an entirely isolated environment. The virtual machine may be configured as a gateway management device, a USF, or a CP. For example, the gateway management device, the USF, or the CP may be implemented based on a general-purpose physical server in combination with a network functions virtualization (NFV) technology. The gateway management device, the USF, or the CP is a virtual host, a virtual router, or a virtual switch. After reading this application, a person skilled in the art may virtualize, on the general-purpose physical server by using the NFV technology, the gateway management device, the USF, or the CP having the foregoing functions. Details are not described herein again.

For example, the virtualized device may be a container, and the container is an entity configured to provide an isolated virtualized environment. For example, the container may be a docker container. The container may be configured as a gateway management device, a USF, or a CP. For example, the gateway management device, the USF, or the CP may be created by using a corresponding image. For example, two container instances, namely, a container instance proxy-container 1 and a container instance proxy-container 2, may be created for a proxy-container (a container that provides a proxy service) by using an image of the proxy-container. The container instance proxy-container 1 is provided as the gateway management device or the USF, and the container instance proxy-container 2 is provided as the CP. When a container technology is used for implementation, the gateway management device, the USF, or the CP may run by using a kernel of a physical machine, and a plurality of gateway management devices, USFs, or CPs may share an operating system of the physical machine. Different gateway management devices, USFs, or CPs may be isolated by using the container technology. The containerized gateway management device, USF, or CP may run in a virtualized environment, for example, may run in a virtual machine. Alternatively, the containerized gateway management device, USF, or CP may directly run in a physical machine.

For example, the virtualized device may be a pod. The pod is a basic unit of Kubernetes (where Kubernetes is an open-source container orchestration engine of GOOGLE, and is briefly referred to as K8s) for deploying, managing, and orchestrating a containerized application. The pod may include one or more containers. All containers in a same pod are usually deployed on a same host. Therefore, all the containers in the same pod may communicate with each other through the host, and may share storage resources and network resources of the host. The pod may be configured as a gateway management device, a USF, or a CP. For example, a container as a service (CaaS, which is a container-based PaaS service) may be indicated to create the pod, and the pod is provided as the gateway management device, the USF, or the CP.

Certainly, the gateway management device, the USF, or the CP may alternatively be another virtualized device. This is not listed one by one herein.

In some possible embodiments, the gateway management device, the USF, or the CP may alternatively be implemented by a general-purpose processor. For example, the general-purpose processor may be in a form of a chip. Further, the general-purpose processor implementing the gateway management device, the USF, or the CP includes a processing circuit, and an input interface and an output interface that are internally connected to and communicated with the processing circuit. The processing circuit is configured to perform the packet generation step in the foregoing method embodiments through the input interface. The processing circuit is configured to perform the receiving step in the foregoing method embodiments through the input interface. The processing circuit is configured to perform the sending step in the foregoing method embodiments through the output interface. Optionally, the general-purpose processor may further include a storage medium. The processing circuit is configured to perform the storage step in the foregoing method embodiments through the storage medium. The storage medium may store instructions executed by the processing circuit. The processing circuit is configured to execute the instructions stored in the storage medium, to perform the foregoing method embodiments.

Refer to FIG. 12. An embodiment of this application provides a packet transmission system 1200. The system 1200 includes a gateway management device 1201, a first device 1202, and a second device 1203. Optionally, the gateway management device 1201 is the apparatus 800 or the apparatus 1000.

Alternatively, refer to FIG. 13. An embodiment of this application provides a packet transmission system 1300. The system 1300 includes a USF 1301, a CP 1302, a first device 1303, and a second device 1304. The USF 1301 is the apparatus 800 or the apparatus 1000, and the CP 1302 is the apparatus 900 or the apparatus 1100.

An embodiment of this application provides a computer program product. When the computer program product runs on a gateway management device, a USF, or a CP, the gateway management device, the USF, or the CP is enabled to perform the method 400 or the method 500 in the foregoing method embodiments.

The devices in the foregoing product forms separately have any function of the gateway management device, the USF, or the CP in the foregoing method embodiments. Details are not described herein again.

A person of ordinary skill in the art may be aware that the method steps and units that are described with reference to embodiments disclosed in this specification can be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In several embodiments provided in this application, the disclosed systems, apparatuses and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between the apparatuses or units may be implemented in electrical, mechanical, or other forms.

The units described as separate parts may or may not be physically separate. Parts displayed as units may or may not be physical units, for example, may be located in one position, or may be distributed on a plurality of network units. Some or all of the units may be selected based on an actual requirement to achieve the objectives of the solutions of embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by software, hardware, firmware, or any combination thereof. When software is used for implementation, all or some of embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer program instructions may be transmitted from a web site, computer, server, or data center to another web site, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), or a semiconductor medium (for example, a solid-state drive (SSD)), or the like.

A person of ordinary skill in the art may understand that all or some of the steps of the foregoing embodiments may be implemented by hardware or a program instructing related hardware. The program may be stored in a computer-readable storage medium. The storage medium may be a ROM, a magnetic disk, an optical disc, or the like.

The foregoing descriptions are only optional embodiments of this application, but are not intended to limit this application. Any modification, equivalent replacement, or improvement made within the principle of this application should fall within the protection scope of this application.

What is claimed is:

1. A method implemented by a gateway management device, comprising:
    receiving, from a steering function (SF) device, a service request comprising service information of a terminal device that is to perform access, wherein the service information comprises a first service-level agreement (SLA) level of the terminal device;
    determining, based on the first SLA level, a first user plane (UP) device and a first sliced network;
    wherein the first sliced network is between the first UP device and the SF device,
    wherein the first sliced network is for transmitting a data packet of the terminal device;
    receiving a control message comprising a second SLA level of the terminal device; and
    determining, based on the second SLA level, a second UP device and a second sliced network that meet the second SLA level, wherein the second sliced network is between the second UP device and the SF device, and wherein the second sliced network is for transmitting the data packet.

2. The method of claim 1, wherein the service information comprises a user identifier of the terminal device.

3. The method of claim 1, further comprising obtaining the first SLA level based on a user identifier of the terminal device.

4. The method of claim 1, further comprising:
obtaining, based on the first SLA level, a device identifier of the first UP device and a network identifier of the first sliced network;
determining the first UP device based on the device identifier; and
determining the first sliced network based on the network identifier.

5. The method of claim 4, further comprising sending interface information to the first UP device based on the device identifier of the first UP device and the network identifier of the first sliced network, wherein the interface information comprises an interface corresponding to the first sliced network on the first UP device.

6. The method of claim 1, further comprising sending a configuration instruction instructing the SF device to configure an interface corresponding to the first sliced network on the SF device.

7. The method of claim 6, wherein the configuration instruction comprises an identifier of the terminal device and interface information, and wherein the configuration instruction further instructs the SF device to bind a virtual local area network (VLAN) corresponding to the identifier and the interface.

8. The method of claim 6, wherein the configuration instruction comprises user information corresponding to the terminal device, a first device identifier of the SF device, and a network identifier of the first sliced network, and wherein the configuration instruction instructs a controller to send a control message to the SF device based on the user information, the first device identifier, and the network identifier to instruct the SF device to bind a virtual local area network (VLAN) corresponding to a second device identifier of the terminal device and the interface.

9. The method of claim 1, further comprising:
sending a configuration instruction instructing the first UP device to bind the first sliced network and a second sliced network, wherein a second transmission performance of the second sliced network corresponds to a first transmission performance of the first sliced network, and wherein the second sliced network is for transmitting the data packet through the first sliced network; and
controlling the data packet for transmission through the first sliced network.

10. The method of claim 1, wherein the method is applied to a bandwidth access network system in which a control plane (CP) and a UP are separated.

11. The method of claim 1, wherein the first UP device comprises a broadband network gateway (BNG) UP device.

12. An apparatus of a gateway management device comprising:
a transceiver configured to receive, from a steering function (SF) device, a service request comprising service information of a terminal device that is to perform access, wherein the service information comprises a first service-level agreement (SLA) level of the terminal device; and
a processor coupled to the transceiver and configured to:
determine, based on the first SLA level, a first user plane (UP) device and a first sliced network;
wherein the first sliced network is between the first UP device and the SF device,
wherein the first sliced network is for transmitting a data packet of the terminal device;
receive a control message comprising a second SLA level of the terminal device; and
determine, based on the second SLA level, a second UP device and a second sliced network that meet the second SLA level, wherein the second sliced network is between the second UP device and the SF device, and wherein the second sliced network is for transmitting the data packet.

13. The apparatus of claim 12, wherein the service information comprises a user identifier of the terminal device, and wherein the processor is further configured to obtain the SLA level based on the user identifier.

14. The apparatus of claim 12, wherein the processor is further configured to:
obtain, based on the first SLA level, a device identifier of the first UP device and a network identifier of the first sliced network;
determine the first UP device based on the device identifier; and
determine the first sliced network based on the network identifier.

15. The apparatus of claim 12, wherein the transceiver is further configured to send a configuration instruction instructing the first UP device to bind the first sliced network and a second sliced network, wherein a second transmission performance of the second sliced network corresponds to a first transmission performance of the first sliced network, and wherein the second sliced network is for transmitting the data packet from the first sliced network, and wherein the processor is further configured to control the data packet to transmit through the first sliced network.

16. A system comprising:
a first user plane (UP) device;
a steering function (SF) device configured to:
receive a service request, wherein the service request comprises service information of a terminal device that is to perform access, wherein the service information comprises a first service-level agreement (SLA) level of the terminal device; and
forward the service request; and
a gateway management device coupled to the first UP device and the SF device and configured to:
receive the service request from the SF device;
determine, based on the first SLA level, a first UP device and a first sliced network;
wherein the first sliced network is between the first UP device and the SF device,
wherein the first sliced network is for transmitting a data packet of the terminal device;
receive a control message comprising a second SLA level of the terminal device; and
determine, based on the second SLA level, a second UP device and a second sliced network that meet the second SLA level, wherein the second sliced network is between the second UP device and the SF device, and wherein the second sliced network is for transmitting the data packet.

17. The system of claim 16, wherein the gateway management device is further configured to:

obtain, based on the first SLA level, a device identifier of the first UP device and a network identifier of the first sliced network;

determine the first UP device based on the device identifier; and determine the first sliced network based on the network identifier.

18. The system of claim 16, wherein the gateway management device is further configured to:

send a configuration instruction instructing the first UP device to bind the first sliced network and a second sliced network, wherein a second transmission performance of the second sliced network corresponds to a first transmission performance of the first sliced network, and wherein the second sliced network is for transmitting the data packet through the first sliced network; and control the data packet for transmission through the first sliced network.

* * * * *